Jan. 16, 1940. C. A. HUBER 2,187,153
DISPENSING APPARATUS
Filed May 23, 1939 3 Sheets-Sheet 3
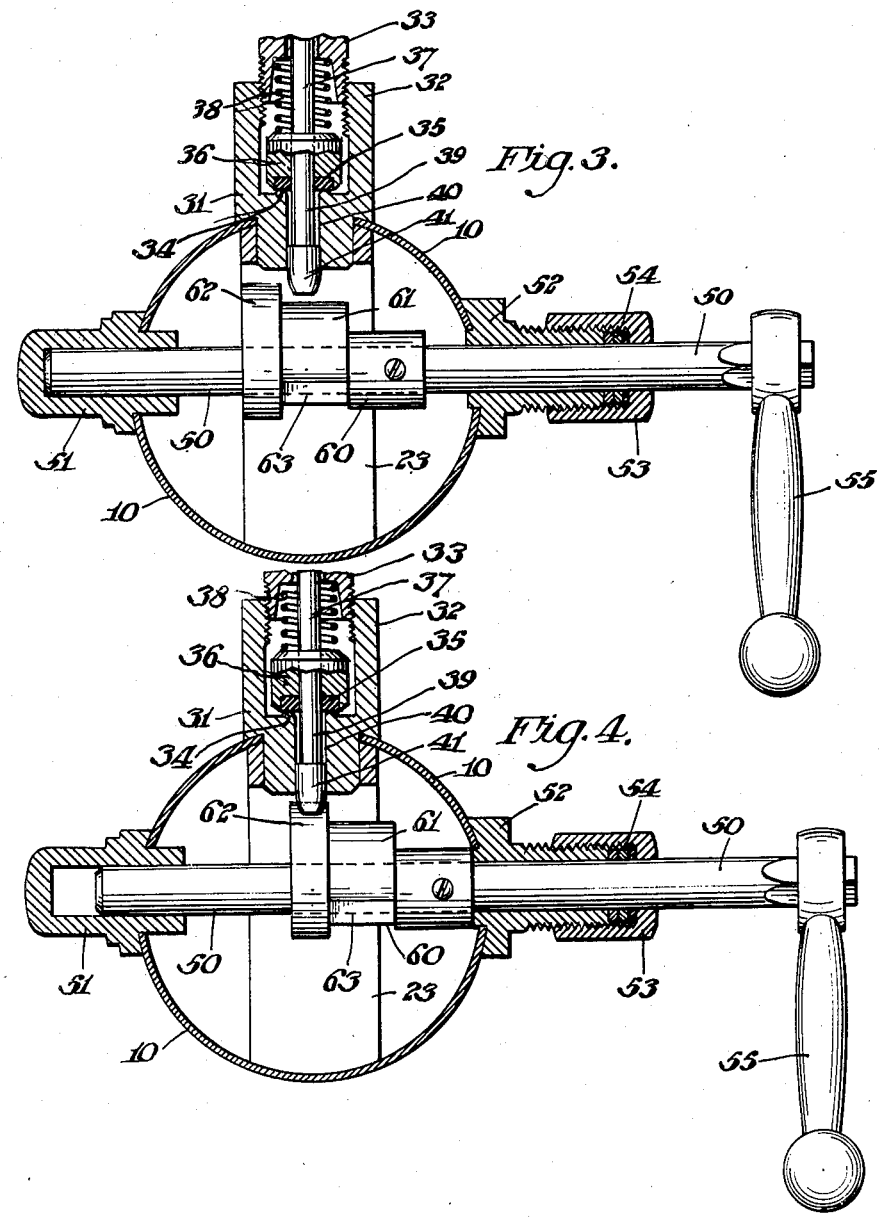
INVENTOR:
Charles A. Huber,
BY Jas. C. Wobensmith
ATTORNEY.

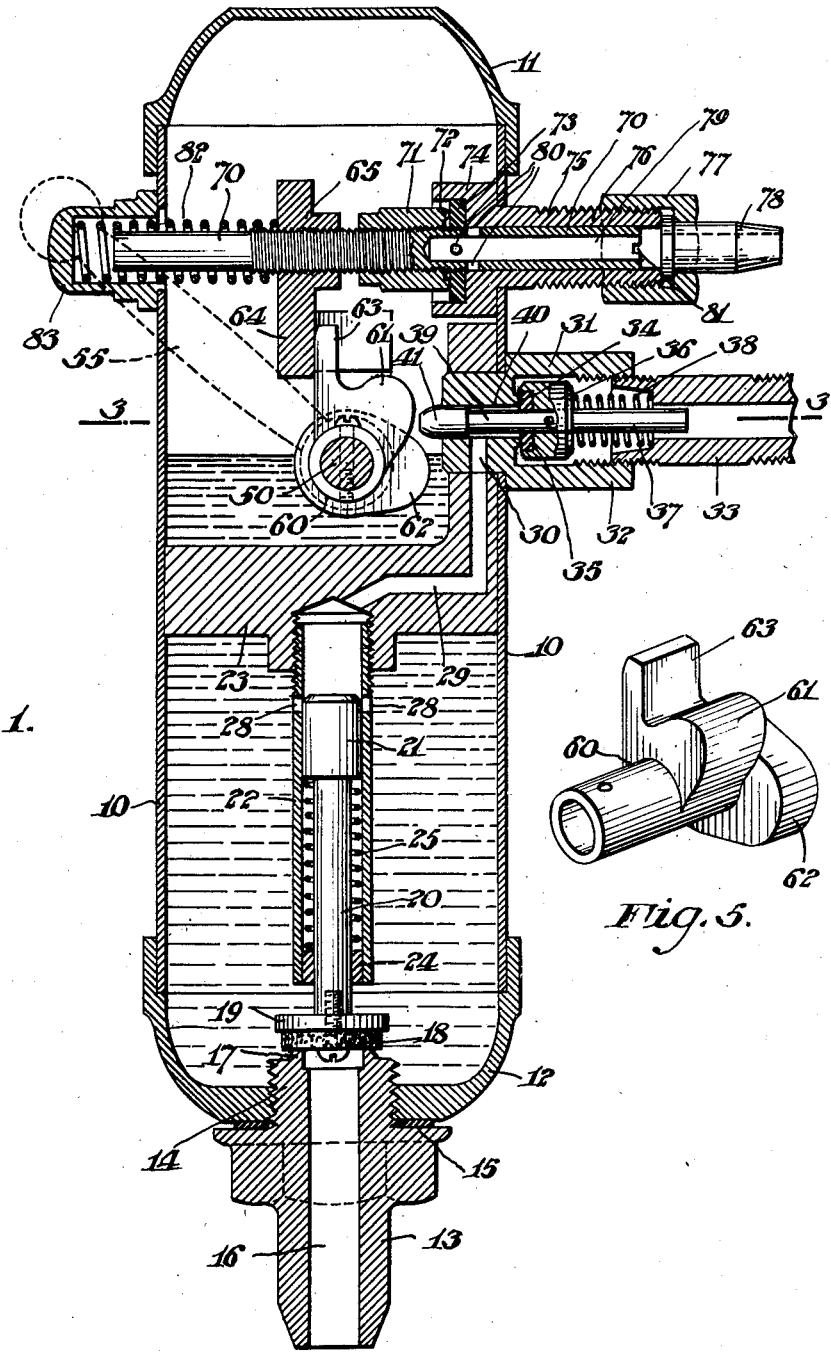

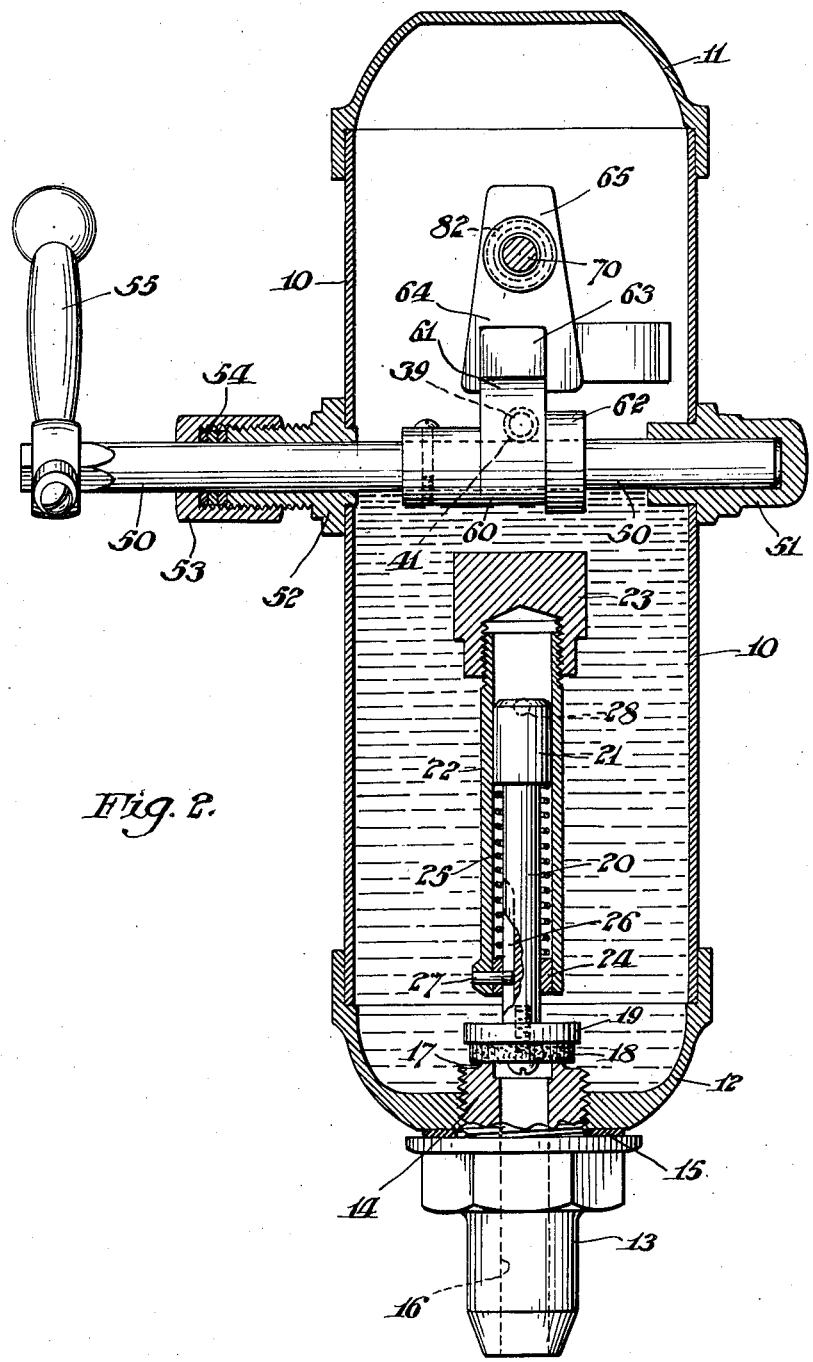

Patented Jan. 16, 1940

2,187,153

UNITED STATES PATENT OFFICE 2,187,153

DISPENSING APPARATUS

Charles A. Huber, Philadelphia, Pa.

Application May 23, 1939, Serial No. 275,295

14 Claims. (Cl. 225—21)

This invention relates to dispensing apparatus and it relates more particularly to improved means for dispensing charged liquids such as seltzer water or the like.

In the dispensing of charged waters in places where considerable quantities of the same are called for, it has been customary to supply the same in tanks which may be disposed in suitable coolers and connected by a pipe line to a dispensing device at the place of delivery.

However, in the use of seltzer waters and the like, some of the customers desire the same in an effervescent or live condition, while others prefer it in a more or less flat or dead condition.

The object, therefore, of the present invention is to provide a dispensing device by means of which the charged liquids may be delivered, either in an effervescent or live condition, or in a more or less flat or dead condition in which most of the gas in the charged liquid has been released.

With the foregoing object in view, the present invention contemplates the provision of dispensing apparatus which is connected by a pipe line to a suitable source of supply, and which is so constructed and arranged that by suitable manipulation of preferably a single operating handle the charged liquid may be delivered either in a live or dead condition as the same may be desired.

The invention also contemplates the provision of dispensing apparatus, operating as aforesaid, which will be relatively simple in construction and operation, but which will function efficiently to obtain the desired results.

The nature and characteristic features of the invention will be more readily understood from the following description, taken in connection with the accompanying drawings forming part hereof, in which:

Figure 1 is a vertical central sectional view illustrating a dispensing device embodying the main features of the present invention, certain of the internal parts being shown in elevation;

Fig. 2 is a similar view, the section being taken transversely to Fig. 1;

Fig. 3 is a horizontal section taken approximately on the line 3—3 of Fig. 1;

Fig. 4 is a similar view in which, however, the main operating shaft and the cam device mounted thereon are shown shifted longitudinally for a different operation of the respective valves; and Fig. 5 is a perspective view of a cam device mounted on the main operating shaft for actuating the valves regulating the dispensing of the charged liquid by means of the device.

It should, of course, be understood that the description and drawings herein are illustrative merely, and that various modifications and changes may be made in the structure disclosed without departing from the spirit of the invention.

Referring to the drawings, in the particular embodiment of the invention therein shown, 10 is a cylindrical casing forming a reservoir, preferably made of a tube, having a closure cap 11 at the top thereof, and a somewhat similar cap 12 at the bottom thereof.

A delivery nozzle 13 is mounted in the lower cap 12 in a suitable manner, such for example, as by means of the nipple portion 14 which is threaded into the cap member 12. A washer 15 may be interposed between the portion of the nozzle member and a portion of the cap member to prevent leakage at this point.

The delivery nozzle 13 is provided with a central passage-way 16 through which the liquid within the casing or reservoir may be freely discharged when the delivery valve, to be presently described, is raised from its seat.

The upper inner end of the threaded nipple 14 of the nozzle member 13 is provided with a valve seat 17 which is adapted to be engaged, to close the passage-way 16 in the nozzle member 13, by a washer member 18 which is mounted on the underside of a valve disk 19. The valve disk 19 is carried at the lower end of a stem 20.

The upper end of the stem 20 is provided with an enlarged head portion 21 which constitutes, in effect, a piston, which is slidably mounted in a cylindrical member 22.

The cylindrical member 22 is threaded at its upper end in a bracket member 23 which is fixedly mounted within the interior of the tubular casing 10.

At the lower end of the cylindrical member 22, there is mounted an internal sleeve or collar 24 which serves to guide the stem 20 and also acts as a seat for the lower end of a coil spring 25 which surrounds the stem 20. The upper end of the coil spring 25 bears against the underside of the enlarged head or piston 21 and thereby normally tends to raise the valve washer 18 from the seat 17 provided on the upper face of the nipple portion 14 of the nozzle member 13.

The stem 20 is also provided with a longitudinal groove 26 which is engaged by a pin 27 mounted in the lower end of the cylindrical member 22. The pin 27 extends inwardly through the collar 24 into the said groove 26, for the purpose of preventing the valve structure from turning on its axis, which might tend to loosen the valve washer 18 from its supporting disk 19.

The cylindrical member 22 is provided with ports 28 so positioned as to afford a communication between the interior of the cylindrical member 22 and the interior of the casing 10, in a manner and for a purpose to be hereinafter more fully set forth.

The bracket member 23 is provided with a port or passage-way 29 extending from above the top of the cylindrical member 22. The port 29 communicates with a port or passage-way 30 in an inwardly extending portion of the housing 31 of a liquid inlet valve structure which is mounted on the side of the casing 10.

The housing 31 of the liquid inlet valve structure is internally threaded, in an outwardly extending portion 32, for the connection thereto of a pipe 33 which leads from the tank, or other source of supply (not shown), of the charged liquid. The valve housing 31 is also provided with a valve seat 34 upon which a valve washer 35 is normally seated. The valve washer 35 is carried by the valve member 36, which is also provided with a rearwardly extending stem 37. The stem 37 is surrounded by a coil spring 38. One end of the coil spring 38 bears against the valve member 36, while the other end thereof bears against a portion of the connection pipe 33. The spring serves to maintain the valve washer 35 normally on its seat 34.

The valve member 36 is also provided with a forwardly extending stem 39 passing through a suitable port or passage-way 40 in the inwardly extending portion 30 of the valve housing 31. The stem 39 for a portion of its length is smaller in diameter than the passage-way 40, thereby to permit the charged liquid to pass to the port or passage-way 30 and thence to the port or passage-way 29 in the bracket member 23 when the valve is open. The forward end of the stem 39 is provided with an enlarged and rounded head portion 41 which is adapted to be engaged and actuated by the cams to be presently described.

Disposed in front of the head portion 41 of the valve stem 39 is a transversely extending shaft 50. The shaft 50 is suitably journaled at one end in a cap 51 which is mounted in the wall of the casing 10 and, on the opposite side of the casing 10, said shaft 50 extends through a bearing 52 which is also secured to the casing 10 at that point.

The bearing 52 is provided with a cap member 53 threaded thereon, which serves to compress suitable packing 54 against the portion of the shaft 50 passing therethrough, thereby to provide a stuffing box to prevent leakage along the shaft 50 of the contents of the casing 10.

The outer end of the shaft 50 is provided with a suitable operating handle 55 for manual actuation by the user. The shaft 50 is mounted in the casing 10 so as to have a limited range of rotative movement in either direction, and also to have a limited range of longitudinal movement, for a purpose to be presently explained.

The shaft also has mounted thereon, interiorly of the casing 10, a cam device 60 of a peculiar conformation. This cam structure 60 is so designed and positioned on the shaft 50 as to provide a cam lobe 61 which is adapted to encounter the head portion 41 of the stem 39 of the liquid inlet valve when actuated in one direction and when the shaft 50 is in a certain longitudinal position, and is also provided with another cam lobe 62 which is adapted to engage the head portion 41 of the stem 39 of the liquid inlet valve when the shaft 50 is actuated in a contrary direction and is in a different longitudinal position.

The cam device 60 is also provided with an extending arm portion 63 which is adapted, when the shaft 50 is actuated in one direction, to engage a downwardly extending lug 64 of a member 65 which is adjustably mounted on a stem 70. The stem 70 is slidably mounted in the casing 10 and extends across the same above and transversely to the shaft 50.

The stem 70, upon which the lug member 65 is mounted, is also provided with a gas release valve member 71 fixedly mounted thereon and having a seat portion 72 adapted to engage a washer 73 which is mounted in the head portion 74 of a spud 75. The spud 75 is mounted in the wall of the casing 10 with the head portion 74 thereof internally disposed.

The spud 75 is also provided with an outer threaded portion 76 adapted to be engaged by the threaded cap member 77 of a union coupling, the nipple portion 78 of which is thereby held on the end of the spud 75.

One end of the stem 70 is slidably mounted in the spud 75 and is thereby supported for longitudinal actuation to open the valve. The end of the stem 70, which is slidably supported within the spud 75, is provided with an internal bore or passage-way 79, and orifices 80 extend from the internal bore 79 of the stem 70 to the exterior thereof. These orifices 80 are located adjacent the valve member 71 whereby a communication is provided between the upper interior portion of the casing 10 through said orifices 80 and thence through the hollow interior 79 of the stem 70 to provide a gas outlet when the valve is open.

The lug member 65 is in threaded engagement with the stem 70 at the place where it is mounted on the same, and the end of the stem 70, which is positioned within the spud 75, is provided with a transverse slot 81 whereby the same may be engaged by a screw-driver to adjust the lug member 65 longitudinally on the stem 70, so as to insure the actuation of the valve stem 70 at the proper time when the handle shaft 50 is actuated in a certain direction.

A coil spring 82 is mounted on the stem 70, and one end of said coil spring 82 bears against the said lug member 65. The other end of the coil spring 82 is seated in a cap member 83 which is mounted on the casing 10. The coil spring 82 serves to impel the valve member 71 on the stem 70 to its seat, thereby to close the gas outlet whenever the handle 55 is released or is actuated in a direction toward the rear.

The operation of the device will now be explained.

In the normal use of the apparatus, there will usually be some charged liquid remaining in the casing 10, but in any event, in order to supply the same with the normal and proper amount of charged liquid, the handle shaft 55 is brought to such longitudinal position, if the same is not already in such position, to bring the cam lobe 61 opposite the enlarged head portion 41 of the stem 39 of the liquid inlet valve. The handle 55 now being rotated upwardly and toward the rear, the cam lobe 61 will encounter the head portion 41 of the stem 39 of the liquid inlet valve and thereby push the valve washer 35 from the seat 34.

The charged liquid will now flow from the tank, or other source of supply (not shown) through the pipe 33 around the valve 36, through the passage-way 40 in the valve housing 31, thence through the port or passage-way 30 in the inwardly extending portion of the valve housing 31, thence through the port or passageway 29 in the bracket member 23 to the upper end of the depending cylindrical member 22. The inflowing liquid will first cause the piston 21 to be actuated and thus impel the discharge valve disk 19 and its washer 18 to the seat 17 and thereby close the discharge passage-way 16 in the delivery nozzle 13.

The actuation of the piston 21 to its normal position, upon bringing the washer 18 of the discharge valve to its seat, will cause the ports 28 in the cylindrical member 22 to be opened. The liquid will then be permitted to flow through said ports 28 to the interior of the casing 10. The liquid will continue to flow to the interior of the casing 10 until the entrapped gas in the upper portion of the casing 10 is compressed to a degree where the same is substantially equal to the pressure in the supply tank.

The casing 10 will now be filled with the proper amount of the liquid which, being under the same pressure as that of the supply tank, will retain most of the gas therein.

When it is desired to draw off the charged liquid in an effervescent condition, the handle 55 is moved forwardly and downwardly, whereby the extending arm 63 of the cam device 60 will engage the downwardly extending lug 64 which is carried by the stem 70 of the gas release valve, opening said valve and permitting the escape of the gas in the upper end of the casing 10 until the same reaches atmospheric pressure.

When the pressure in the top of the casing 10 is thus relieved, the coil spring 25 which is mounted in the depending cylindrical member 22, and which bears against the underside of the piston 21, will cause the valve washer 18 to be raised from its seat and will permit the liquid to flow from the bottom of the casing 10, through the discharge outlet 16 of the nozzle 13 to the drinking glass or other receptacle (not shown) which is placed below the nozzle 13 to receive the discharged liquid.

When a sufficient quantity of the liquid has been drawn off, the handle 55 is actuated in a contrary direction, that is, upwardly and to the rear, thus permitting the gas release valve to close and opening the valve which controls the flow of the liquid from the supply tank, permitting the same to enter, as hereinbefore described, and when so doing to close the discharge valve through the action of the incoming liquid on the piston 21. The handle 55 being held in this position, the liquid will continue to flow until the casing 10 has refilled to the point where the entrapped gas in the top of the casing 10 is compressed to a degree substantially equal to the pressure in the supply tank.

When it is desired to deliver the liquid in a quiescent or dead state, the handle shaft 50 is shifted longitudinally to bring the cam lobe 62 in alinement with the enlarged head portion 41 of the stem 39 of the liquid inlet valve. The handle 55 is then actuated downwardly and forwardly, whereupon the extending arm 63 of the cam member 60, through its engagement with the lug 64 carried by the stem 70 of the gas release valve, will cause said valve to be opened and thus relieve the pressure in the top of the casing 10.

As the operator continues to move the handle 55 downwardly and forwardly, the cam lobe 62 will encounter the end of the enlarged head portion 41 of the valve stem 39 before the pressure in the casing has been relieved sufficiently to permit the discharge valve to open. This will permit a small quantity of the charged liquid to be injected into the supply within the casing 10, thoroughly agitating the same. This agitation of the liquid within the casing 10, while the gas release valve is open, will cause the liquid contained within the casing 10 to discharge the greater part of its gas with the result that, when the same is drawn off through the passage-way 16 in the discharge nozzle 13, the same will be in a more or less quiescent or relatively dead condition.

It should be understood that after the gas release valve is opened, a certain time period will elapse before the pressure of the entrapped gas within the top of the casing is relieved sufficiently to permit the discharge valve to open and, before the expiration of this period, the cam lobe 62 will be brought into engagement with the enlarged head portion 41 of the stem 39 of the liquid inlet valve to cause the same to be opened. Consequently, the liquid, which is thus introduced for the purpose of agitating the liquid within the casing, will, by reason of the pressure thereof being exerted on the top of the piston 21, cause the valve 18 to be held on its seat as long as the agitating stream continues to flow. Upon the return movement of the handle 55, during the period after the cam lobe 62 is freed of engagement with the head portion 41 of the stem 39 of the liquid inlet valve, any pressure remaining within the casing will be relieved so that thereafter the discharge valve may be raised from its seat by the spring 25 to permit the liquid to flow from the casing.

I claim:

1. Apparatus adapted to be connected to a source of supply of charged liquid for dispensing said liquid, said apparatus comprising a casing, a normally closed inlet valve, a normally closed gas release valve, a normally closed liquid discharge valve, manually actuated means for opening the gas release valve, manually actuated means for opening the inlet valve when the gas release valve is closed thereby to refill the casing, manually actuated means for opening the inlet valve when the gas release valve is open thereby to agitate the liquid within the casing to drive off the greater part of the gas therefrom before the same is delivered from the casing, and means for opening the liquid discharge valve.

2. Apparatus adapted to be connected to a source of supply of charged liquid for dispensing said liquid, said apparatus comprising a casing, a normally closed inlet valve, a normally closed gas release valve, a normally closed liquid discharge valve, manually actuated means for opening the gas release valve, manually actuated means for opening the inlet valve when the gas release valve is closed thereby to refill the casing, manually actuated means for opening the inlet valve when the gas release valve is open thereby to agitate the liquid within the casing to drive off the greater part of the gas therefrom before the same is delivered from the casing, and means for automatically opening the liquid discharge valve when the pressure within the casing has been relieved.

3. Apparatus adapted to be connected to a source of supply of charged liquid for dispensing said liquid, said apparatus comprising a casing, a normally closed inlet valve, a normally closed gas release valve, a normally closed liquid discharge valve, a manually operable shaft having a limited range of rotative movement in each direction and also having a limited range of movement longitudinally to two different positions, means for opening the gas release valve when said shaft is rotated in one direction while in either longitudinal position, means for closing said gas release valve when said shaft is rotated in the other direction while in either longitudinal position, means for actuating the inlet valve when said shaft is in one longitudinal position and is rotated to open the gas release valve thereby to agitate the liquid within the casing to drive off the greater part of the gas therefrom before the same is delivered from the casing, and means for opening the liquid discharge valve.

4. Apparatus adapted to be connected to a source of supply of charged liquid for dispensing said liquid, said apparatus comprising a casing, a normally closed inlet valve, a normally closed gas release valve, a normally closed liquid discharge valve, a manually operable shaft having a limited range of rotative movement in each direction and also having a limited range of movement longitudinally to two different positions, means for opening the gas release valve when said shaft is rotated in one direction while in either longitudinal position, means for closing said gas release valve when said shaft is rotated in the other direction while in either longitudinal position, means for opening the inlet valve when said shaft is in one longitudinal position and is rotated to close the gas release valve thereby to refill the casing, and means for opening the liquid discharge valve.

5. Apparatus adapted to be connected to a source of supply of charged liquid for dispensing said liquid, said apparatus comprising a casing, a normally closed inlet valve, a normally closed gas release valve, a normally closed liquid discharge valve, a manually operable shaft having a limited range of rotative movement in each direction and also having a limited range of movement longitudinally to two different positions, means for opening the gas release valve when said shaft is rotated in one direction while in either longitudinal position, means for closing said gas release valve when said shaft is rotated in the other direction while in either longitudinal position, means for opening the inlet valve when said shaft is in one longitudinal position and is rotated to close the gas release valve thereby to refill the casing, means for actuating the inlet valve when said shaft is in another longitudinal position and is rotated to open the gas release valve thereby to agitate the liquid within the casing to drive off the greater part of the gas therefrom before the same is delivered from the casing, and means for opening the liquid discharge valve.

6. Apparatus adapted to be connected to a source of supply of charged liquid for dispensing said liquid, said apparatus comprising a casing, a normally closed inlet valve, a normally closed gas release valve, a liquid discharge valve normally held on its seat by the pressure within the casing, means actuated by the inflowing liquid for impelling the liquid discharge valve to its seat, a manually operable shaft having a limited range of rotative movement in each direction and also having a limited range of longitudinal movement of two different positions, and a member carried by said shaft for actuating the gas release valve when rotated in one direction in either longitudinal position thereby to relieve the pressure within the casing and permit the liquid discharge valve to be raised from its seat.

7. Apparatus adapted to be connected to a source of supply of charged liquid for dispensing said liquid, said apparatus comprising a casing, a normally closed inlet valve, a normally closed gas release valve, a liquid discharge valve normally held on its seat by the pressure within the casing, means actuated by the inflowing liquid for impelling the liquid discharge valve to its seat, a spring tending to raise said liquid discharge valve from its seat, a manually operable shaft having a limited range of rotative movement in each direction and also having a limited range of longitudinal movement to two different positions, and a member carried by said shaft for actuating the gas release valve when rotated in one direction in either longitudinal position thereby to relieve the pressure within the casing and permit the liquid discharge valve to be raised from its seat.

8. Apparatus adapted to be connected to a source of supply of charged liquid for dispensing said liquid, said apparatus comprising a casing, a normally closed inlet valve, a normally closed gas release valve, a liquid discharge valve normally held on its seat by the pressure within the casing, means actuated by the inflowing liquid for impelling the liquid discharge valve to its seat, a spring tending to raise said liquid discharge valve from its seat, a manually operable shaft having a limited range of rotative movement in each direction and also having a limited range of longitudinal movement to two different positions, a member carried by said shaft for actuating the gas release valve when rotated in one direction in either longitudinal position thereby to relieve the pressure within the casing, and another member carried by said shaft for actuating the liquid inlet valve when rotated in another longitudinal position and when the gas release valve is open thereby to agitate the liquid within the casing to drive off the greater part of the gas therefrom before the same is delivered from the casing.

9. Apparatus adapted to be connected to a source of supply of charged liquid for dispensing said liquid, said apparatus comprising a casing, a normally closed inlet valve, a normally closed gas release valve, a liquid discharge valve normally held on its seat by the pressure within the casing, means actuated by the inflowing liquid for impelling the liquid discharge valve to its seat, a spring tending to raise said liquid discharge valve from its seat, a manually operable shaft having a limited range of rotative movement in each direction and also having a limited range of longitudinal movement to two different positions, a member carried by said shaft for actuating the gas release valve when rotated in one direction in either longitudinal position thereby to relieve the pressure within the casing, another member carried by said shaft for opening the liquid inlet valve when rotated in one longitudinal position thereby to refill the casing, and another member carried by said shaft for actuating the liquid inlet valve when rotated in another longitudinal position and when the gas release valve is open thereby to agitate the liquid within the casing to drive off the greater part of the gas therefrom before the same is delivered from the casing.

10. Apparatus adapted to be connected to a source of supply of charged liquid for dispensing said liquid, said apparatus comprising a casing, a normally closed inlet valve, a normally closed gas release valve, a liquid discharge valve normally held on its seat by the pressure within the casing, means actuated by the inflowing liquid for impelling the liquid discharge valve to its seat, a spring tending to raise said liquid discharge valve from its seat, a manually operable device for actuating the gas release valve to relieve the pressure within the casing, said manually operable device also having means when differently operated for actuating the liquid inlet valve when the gas release valve is open thereby to agitate the liquid within the casing to drive off the greater part of the gas therefrom before the same is delivered from the casing.

11. Apparatus adapted to be connected to a source of supply of charged liquid for dispensing said liquid, said apparatus comprising a casing, a normally closed inlet valve, a normally closed gas release valve, a liquid discharge valve normally held on its seat by the pressure within the casing, means actuated by the inflowing liquid for impelling the liquid discharge valve to its seat, a spring tending to raise said liquid discharge valve from its seat, a manually operable device for actuating the gas release valve to relieve the pressure within the casing, said manually operable device also having means when differently operated for opening the liquid inlet valve to refill the casing, said manually operable device also having means when still differently operated for actuating the liquid inlet valve when the gas release valve is open thereby to agitate the liquid within the casing to drive off the greater part of the gas therefrom before the same is delivered from the casing.

12. Apparatus adapted to be connected to a source of supply of charged liquid for dispensing said liquid, said apparatus comprising a casing, a normally closed inlet valve, a normally closed gas release valve, a liquid discharge valve normally held on its seat by the pressure within the casing, means actuated by the inflowing liquid for impelling the liquid discharge valve to its seat, a spring tending to raise said liquid discharge valve from its seat, a manually operable shaft, a member carried by said shaft for actuating the gas release valve to relieve the pressure within the casing, and another member carried by said shaft for actuating the liquid inlet valve when the gas release valve is open thereby to agitate the liquid within the casing to drive off the greater part of the gas therefrom before the same is delivered from the casing.

13. Apparatus adapted to be connected to a source of supply of charged liquid for dispensing said liquid, said apparatus comprising a casing, a normally closed inlet valve, a normally closed gas release valve, a liquid discharge valve normally held on its seat by the pressure within the casing, means actuated by the inflowing liquid for impelling the liquid discharge valve to its seat, a spring tending to raise said liquid discharge valve from its seat, a manually operable shaft, a member carried by said shaft for actuating the gas release valve to relieve the pressure within the casing and thereby permit the liquid discharge valve to be raised from its seat, another member carried by said shaft for opening the liquid inlet valve to refill the casing, and another member carried by said shaft for actuating the liquid inlet valve when the gas release valve is open thereby to agitate the liquid within the casing to drive off the greater part of the gas therefrom before the same is delivered from the casing.

14. The method of dispensing charged liquid supplied from a suitable source under pressure, which comprises supplying a quantity of said liquid to a closed receptacle, relieving the pressure in said receptacle by permitting the entrapped gas to escape from the top thereof, and while the pressure in the receptacle is so relieved injecting a small quantity of the liquid under pressure from the source of supply thereby to agitate the liquid within the receptacle to drive off the greater part of the gas therefrom before the same is delivered from said receptacle.

CHARLES A. HUBER.